United States Patent
Yu et al.

(10) Patent No.: US 8,255,656 B2
(45) Date of Patent: Aug. 28, 2012

(54) STORAGE DEVICE, MEMORY CONTROLLER, AND DATA PROTECTION METHOD

(75) Inventors: Hsiang-Hsiung Yu, Hsinchu County (TW); Chung-Lin Wu, Taichung (TW); Yi-Hsiang Huang, Hsinchu (TW); Yu-Chung Shen, Kaohsiung County (TW)

(73) Assignee: Phison Electronics Corp., Miaoli (TW)

( * ) Notice: Subject to any disclaimer, the term of this patent is extended or adjusted under 35 U.S.C. 154(b) by 271 days.

(21) Appl. No.: 12/822,385

(22) Filed: Jun. 24, 2010

(65) Prior Publication Data

US 2011/0066818 A1  Mar. 17, 2011

Related U.S. Application Data

(63) Continuation-in-part of application No. 12/623,227, filed on Nov. 20, 2009.

(30) Foreign Application Priority Data

Sep. 15, 2009 (TW) ............................... 98131096 A
Apr. 12, 2010 (TW) ............................... 99111261 A

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. ......... 711/163; 711/103; 711/173; 711/202
(58) Field of Classification Search ................ 711/103, 711/163, 173, 202
See application file for complete search history.

(56) References Cited

U.S. PATENT DOCUMENTS

| | | | | | |
|---|---|---|---|---|---|
| 6,026,463 | A | * | 2/2000 | Klein | 711/4 |
| 6,901,493 | B1 | * | 5/2005 | Maffezzoni | 711/162 |
| 2007/0033360 | A1 | * | 2/2007 | Kori et al. | 711/163 |
| 2007/0266214 | A1 | * | 11/2007 | Ohyama | 711/163 |
| 2008/0235467 | A1 | * | 9/2008 | Tagawa | 711/154 |
| 2009/0271103 | A1 | * | 10/2009 | Nishio | 701/200 |

* cited by examiner

*Primary Examiner* — Jared Rutz
*Assistant Examiner* — Ryan Bertram
(74) *Attorney, Agent, or Firm* — J.C. Patents

(57) ABSTRACT

A storage device, a memory controller, and a data protection method are provided. The method includes when receiving a read command sent by a host, adopting a corresponding output flow rate limit to determine an operation that is executed on read data corresponding to the read command by the host according to location information included in the read command or a type of a transmission interface between the host and the storage device. The method also includes executing an interference procedure by the storage device to prevent the read data from being copied to the host or slow down the speed of copying the read data to the host when identifying that the operation is a copy operation.

25 Claims, 10 Drawing Sheets

STORAGE DEVICE, MEMORY CONTROLLER, AND DATA PROTECTION METHOD

CROSS-REFERENCE TO RELATED APPLICATION

This application is a continuation-in-part of and claims the priority benefit of U.S. application Ser. No. 12/623,227, filed on Nov. 20, 2009, which claims the priority benefit of Taiwan application serial no. 98131096, filed on Sep. 15, 2009. This application also claims the priority benefit of Taiwan application serial no. 99111261, filed on Apr. 12, 2010. The entirety of each of the above-mentioned patent applications is hereby incorporated by reference herein and made a part of this specification.

BACKGROUND

1. Technology Field

The present invention relates to a data protection method, and particularly to a data protection method capable of preventing data stored in a storage device from being copied easily by a host, and a storage device and a memory controller using the same.

2. Description of Related Art

With the progress of technology, besides the capacity, the portability is an important fact that be considered by a customer when the customer buys a storage medium. Because the volume of a floppy disk is smaller and data stored in an optical disc is not easy to be updated, the floppy disk and the optical disc have declined due to the appear of the flash drive featuring in plug-and-play.

The flash drive is small, thin, light-weighted and portable. And, only if a computer system has a transmission interface complied with the flash drive, it will very convenient to write data into the flash drive or read data from the flash drive. Additionally, the development of flash memory makes the capacity of a flash drive to become more and larger. Therefore, more and more people favor to use flash drives to store various data, such that exchanges of data become more convenient. For example, more and more users utilize flash drives to store video files, such that the video files can be played in a private computer system or a public computer system.

However, data stored in a flash drive may be copied easily to a computer system due to these advantages of the flash drive, such as portability, easy to copy data and so on. In particular, for a product having a copyright, illegal copying will cause great damage on an obligee having the copyright.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data protection method capable of identifying an operation to be executed on data stored in a storage device by a host, thereby preventing the data from being copied illegally to the host.

The present invention is directed to a storage device capable of identifying an operation to be executed on data stored thereon by a host, thereby preventing the data from being copied illegally to the host.

The present invention is directed to a memory controller capable of identifying an operation to be executed on data stored in a storage device by a host, thereby preventing the data from being copied illegally to the host.

According to an exemplary embodiment of the present invention, a data protection method for a storage device is provided, wherein a memory chip of the storage device has a plurality of physical blocks. The method includes configuring a plurality of logical blocks for mapping to at least a portion of the physical blocks, wherein each of the logical blocks includes a plurality of logical addresses. The method also includes respectively setting a plurality of output flow rate limits for a plurality of logical address ranges among the logical blocks based on a plurality of file types, wherein each of the logical address ranges is corresponding to one of the file types. The method still includes receiving a read command from a host, wherein the read command includes location information. The method also includes getting a target logical address range among the logical address ranges according to the location information, and identifying an operation to be executed on read data corresponding to the read command by the host based on the output flow rate limit of the target logical address range. And, when identifying that the operation is a copy operation, the method further includes executing an interference procedure by the storage device to prevent the read data from being copied to the host or slow down the speed of copying the read data to the host.

According to an exemplary embodiment of the present invention, a storage device including a memory chip, a connector and a memory controller is provided. The memory chip has a plurality of physical blocks. The connector is configured to couple to a host. The memory controller is coupled to the memory chip and the connector and configured to execute a plurality of procedures. The memory controller is configured for configuring a plurality of logical blocks for mapping to at least a portion of the physical blocks, wherein each of the logical blocks includes a plurality of logical addresses. The memory controller is also configured for respectively setting a plurality of output flow rate limits for a plurality of logical address ranges among the logical blocks based on a plurality of file types, wherein each of the logical address ranges is corresponding to one of the file types. The memory controller is also configured for receiving a read command including location information from the host, getting a target logical address range among the logical address ranges according to the location information, and identifying an operation to be executed on read data corresponding to the read command by the host based on the output flow rate limit of the target logical address range. And, when identifying that the operation is a copy operation, the memory controller is further configured for executing an interference procedure to prevent the read data from being copied to the host or slow down the speed of copying the read data to the host.

According to an exemplary embodiment of the present invention, a memory controller for managing a plurality of physical blocks of a memory chip of a storage device is provided. This memory controller includes a memory management circuit, a memory interface and a host interface. The memory interface is coupled to the memory management circuit and configured to couple to the memory chip. The host interface is coupled to the memory management circuit and configured for coupling to a host. The memory management circuit is configured to execute a plurality of procedures. The memory management circuit is configured for configuring a plurality of logical blocks for mapping to at least a portion of the physical blocks, wherein each of the logical blocks includes a plurality of logical addresses. The memory management circuit is also configured for respectively setting a plurality of output flow rate limits for a plurality of logical address ranges among the logical blocks based on a plurality of file types, wherein each of the logical address ranges is corresponding to one of the file types. The memory management circuit is also configured for receiving a read command including location information from the host, getting a target logical address range among the logical address ranges according to the location information, and identifying an operation to be executed on read data corresponding to the read command by the host based on the output flow rate limit of the target logical address range. And, when identifying that the operation is a copy operation, the memory management circuit is further configured for executing an interference procedure to prevent the read data from being copied to the host or slow down the speed of copying the read data to the host.

According to an exemplary embodiment of the present invention, a data protection method for a storage device is provided. A memory chip of the storage device has a plurality of physical blocks. The method includes configuring a plurality of logical blocks for mapping to at least a portion of the physical blocks, wherein each of the logical blocks includes a plurality of logical addresses. The method also includes setting a plurality of transmission interface types and a plurality of output flow rate limits respectively corresponding to the transmission interface types. And, when the storage device uses one of the transmission interface types to receive a read command from a host, the method further includes identifying an operation to be executed on read data corresponding to the read command by the host based on the corresponding output flow rate limit of the transmission interface type. And, when identifying that the operation is a copy operation, the method further includes executing an interference procedure by the storage device to prevent the read data from being copied to the host or slow down the speed of copying the read data to the host.

Based on the above, the exemplary embodiments of the present invention adopt different output flow rate limits to identify an operation to be executed on data stored in the storage device by the host. Accordingly, a file is played smooth when the host wants to play the file and the file is not easy to copy to the host when the host wants to copy the file.

In order to make the aforementioned and other features and advantages of the invention more comprehensible, embodiments accompanying figures are described in detail below.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the present invention.

DESCRIPTION OF THE EMBODIMENTS

Figure 1A:
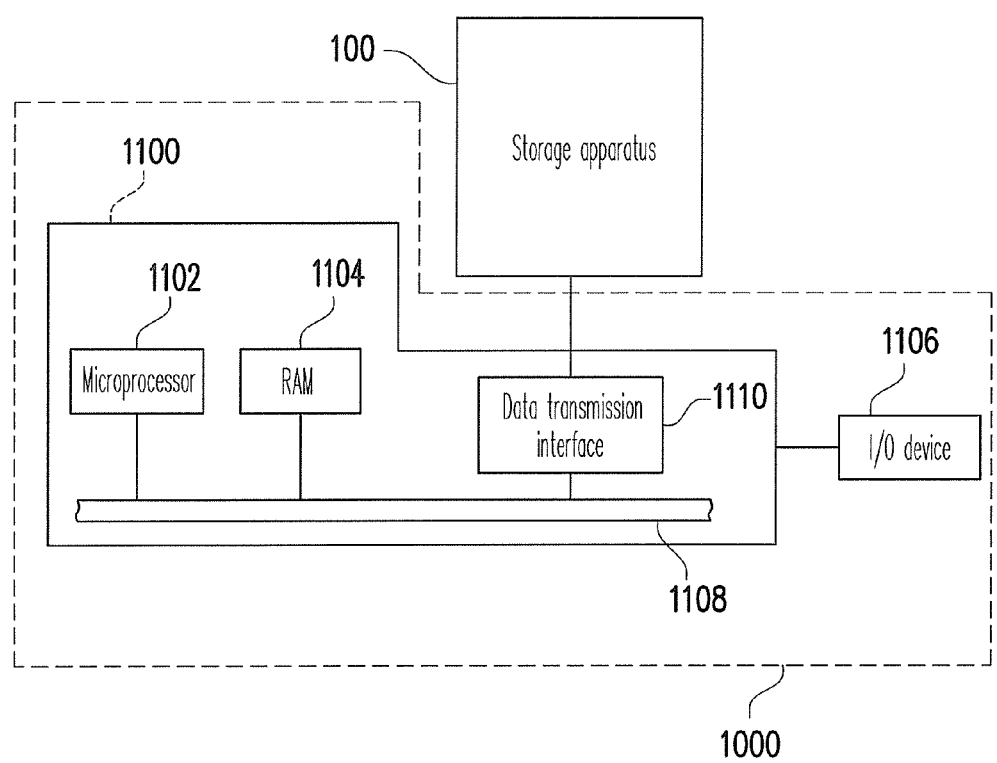
FIG. 1A is a schematic block diagram of a host system using a storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1A is a schematic block diagram of a host system using a storage device according to an exemplary embodiment of the present invention.

Figure 1B:
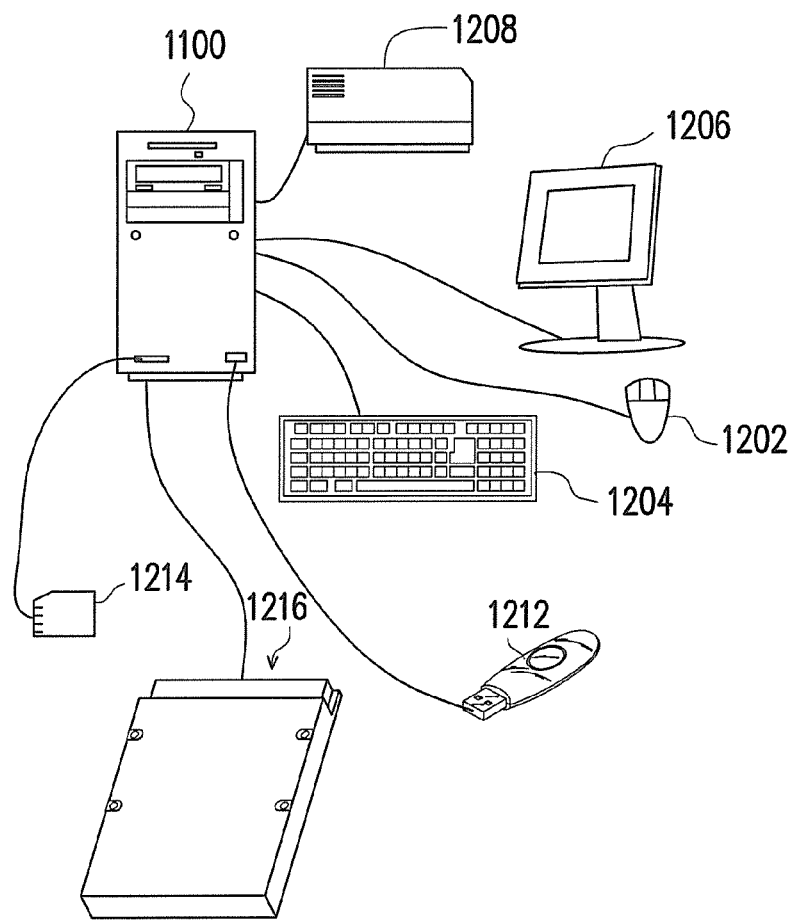
FIG. 1B illustrates a diagram of a computer, an input/output (I/O) device, and a storage device according to an exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the exemplary embodiment of the present invention, a storage device 100 is coupled to the devices of the host system 1000 through the data transmission interface 1110. The host system 1000 may write data into or read data from the storage device 100 through the operations of the microprocessor 1102, the RAM 1104, and the I/O device 1106. For example, the storage device 100 may be a flash drive 1212, a memory card 1214, or a solid state drive (SSD) 1216, as shown in FIG. 1B.

Figure 1C:
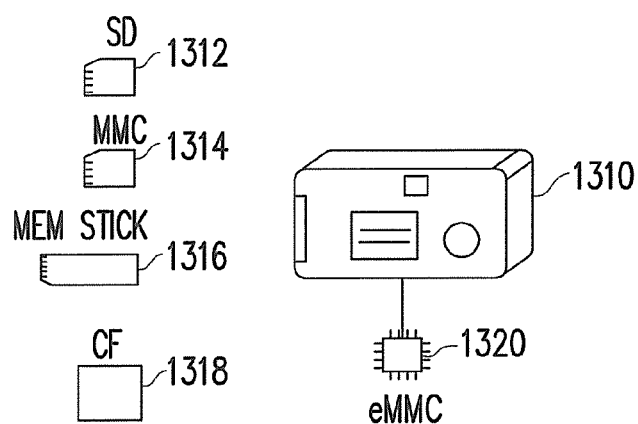
FIG. 1C is a diagram of a host system and a storage device according to another exemplary embodiment of the present invention.

Generally speaking, the host system 1000 may be any system that can store data. Even though the host system 1000 is described as a computer system in the present exemplary embodiment, in another exemplary embodiment of the present invention, the host system 1000 may also be a digital camera, a video camera, a communication device, an audio player, or a video player, and etc. For example, when the host system is a digital camera 1310, the storage device is a secure digital (SD) card 1312, a multimedia card (MMC) 1314, a memory stick 1316, a compact flash (CF) card 1318, or an embedded storage device 1320 used by the digital camera 1310, as shown in FIG. 1C. The embedded storage device 1320 includes an embedded multimedia card (eMMC). It should be noted that the eMMC is directly coupled to the substrate of the host system.

Figure 2:
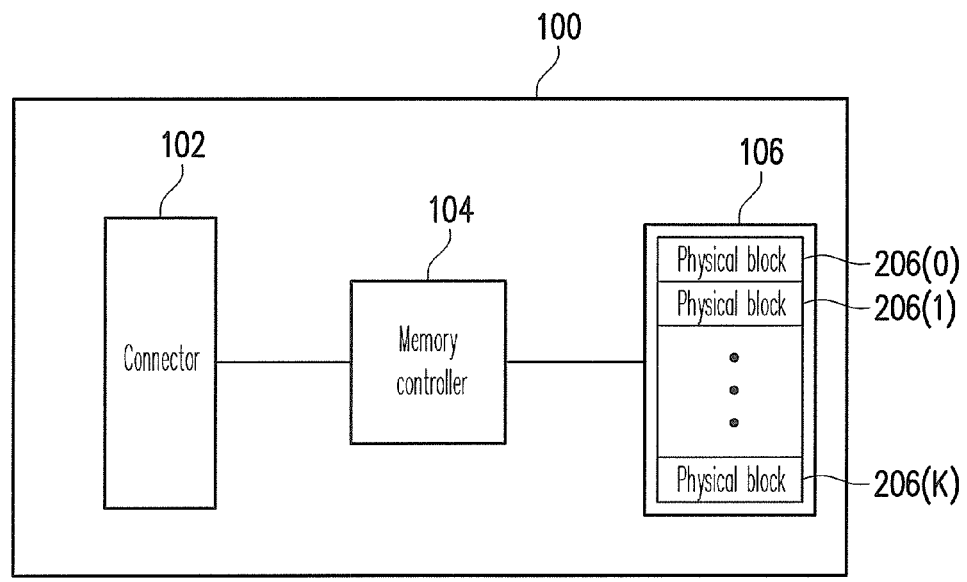
FIG. 2 is a schematic block diagram of the storage device in FIG. 1A.

FIG. 2 is a schematic block diagram of the storage device in FIG. 1A. Referring to FIG. 2, the storage device 100 includes a connector 102, a memory controller 104, and a memory chip 106.

The connector 102 is coupled to the memory controller 104 and is configured for coupling to the host system 1000. In the present exemplary embodiment, a kind of transmission interface supported by the connector 102 is a universal serial bus (USB) interface. However, in another exemplary embodiment, the type of the connector 102 may be the MMC interface, the serial advanced technology attachment (SATA) interface, the parallel advanced technology attachment (PATA) interface, the institute of electrical and electronic engineers (IEEE) 1394 interface, the peripheral component interconnect (PCI) Express interface, the SD interface, the MS interface, the CF interface, the integrated drive electronics (IDE) interface, or any suitable interface which is not limited to the above selection.

The memory controller 104 executes a plurality of logic gates or control instructions implemented in a hardware form or a firmware form and performs various data operations such as data writing, reading, and erasing in the memory chip 106 according to commands of the host system 1000. Additionally, the memory controller 104 further executes a data protection mechanism and a memory management mechanism according to the present exemplary embodiment.

The memory chip 106 is coupled to the memory controller 104. The memory chip 106 is used for storing file system information such as a file allocation table (FAT) and a new technology file system and storing general documents such as video files or audio files. In the present exemplary embodiment, the memory chip 106 has a plurality of physical blocks, such as physical blocks 206(0)~206(K), each of the physical blocks has a plurality of physical addresses (also referred to as physical pages) and the physical pages belonging to the same physical block can be written individually and must be erased simultaneously. In detail, each physical block is the smallest erasing unit. Namely, each physical block contains the least number of memory cells that are erased together. And, one physical page is the smallest programming unit. Namely, each physical page is the smallest unit for writing data.

In this exemplary embodiment, the memory chip 106 is a rewritable non-volatile memory. For example, the memory chip 106 is a multi-level cell (MLC) NAND flash memory chip. However, the present invention is not limited thereto, and the memory chip 106 may also be a single level cell (SLC) NAND flash memory chip, other flash memory chip or other memory chip having the same characteristic.

Figure 3:
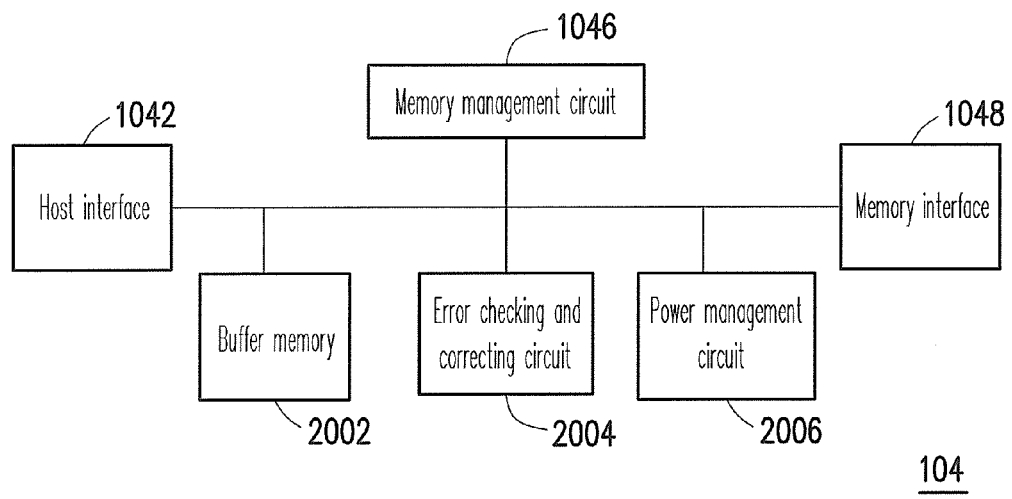
FIG. 3 is a schematic block diagram of a memory controller according to an exemplary embodiment of the present invention.

FIG. 3 is a schematic block diagram of a memory controller according to an exemplary embodiment of the present invention. Referring FIG. 3, the memory controller 104 includes a host interface 1042, a memory management circuit 1046 and a memory interface 1048.

The host interface 1042 is coupled to the memory management circuit 1046 and configured for coupling to the host system 1000 via the connector 102. The host interface 1042 is used to receive and recognize the commands and data transmitted from the host system 1000. Accordingly, the commands and data from the host system 1000 are transmitted to the memory management circuit 1046 through the host interface 1042. According to the present exemplary embodiment, the host interface 1042 is an USB interface. However, in other exemplarily embodiments, the host interface 1042 may also be a MMC interface, a SATA interface, a PATA interface, an IEEE 1394 interface, a PCI Express interface, a SD interface, a MS interface, a CF interface, an IDE interface, or other standardized interfaces.

The memory management circuit 1046 is configured for controlling the whole operation of the memory controller 104. To be specific, the memory management circuit 1046 has a plurality of control instructions, and the control instructions are executed to manage the memory chip 106 according to the data protection mechanism and the memory management mechanism of the present exemplary embodiment during the storage apparatus 100 is operated. The data protection mechanism and the memory management mechanism will be described with drawings in the following.

In the present exemplary embodiment, the control instructions of the memory management circuit 1046 are implemented in a firmware form. For example, the memory management circuit 1046 has a micro-processor unit (not shown) and a read-only memory (not shown), and these control instructions are burned in the read-only memory. When the storage device 100 is operated, these control instructions are executed by the micro-processor unit to accomplish the data protection mechanism and the memory management mechanism according to the present exemplary embodiment.

In another exemplary embodiment of the present invention, the control instructions of the memory management circuit 1046 may be stored in a specific area (for example, the system area of a memory chip 106 exclusively used for storing system data) of the memory chip 106 as program codes. Additionally, the memory management circuit 1046 may have a micro-processor unit (not shown), a read-only memory (not shown) and a random access memory (not shown). And, the read-only memory has a driver code, and when the memory controller 104 is enabled, the micro-processor unit executes the driver code to load the control instructions stored in the memory chip 106 into the random access memory of the memory management circuit 1046. Then, the micro-processor unit runs these control instructions to accomplish the data protection mechanism and the memory management mechanism of the exemplary embodiment of the present invention. Additionally, the control instructions of the memory management circuit 1046 may be implemented in a hardware form.

The memory interface 1048 is coupled to the memory management circuit 1046 and configured to make the memory controller 104 to couple to the memory chip 106. Accordingly, the memory controller 104 may execute related operations to the memory chip 106. Namely, data to be written into the memory chip 106 is converted by the memory interface 1048 into a format acceptable to the memory chip 106.

In another exemplary embodiment of the present invention, the memory controller 104 still includes a buffer memory 2002. The buffer memory 2002 is coupled to the memory management circuit 1046 and configured to temporarily store data and commands from the host system 1000 or data from the memory chip 106.

In another exemplary embodiment of the present invention, the memory controller 104 still includes an error checking and correcting circuit 2004. The error checking and correcting circuit 2004 is coupled to the memory management circuit 1046, and configured for executing an error checking and correcting procedure to ensure data accuracy. Specifically, when the memory controller 104 receives a write command from the host system 1000, the error checking and correcting circuit 2004 generates an error checking and correcting (ECC) code for data corresponding to the write command, and the data to be written and the ECC code corresponding the data are written into the memory chip 106. Subsequently, when receiving a read command for the data from the host system 1000, the memory controller 104 reads the data and the corresponding ECC code. At this time, the error checking and correcting circuit 2004 executes the error checking and correcting procedure on the read data according to the corresponding ECC code.

In another exemplary embodiment of the present invention, the memory controller 104 still includes a power management circuit 2006. The power management circuit 2006 is coupled to the memory management circuit 1046 and configured for controlling the power of the storage device 100.

Figure 4:
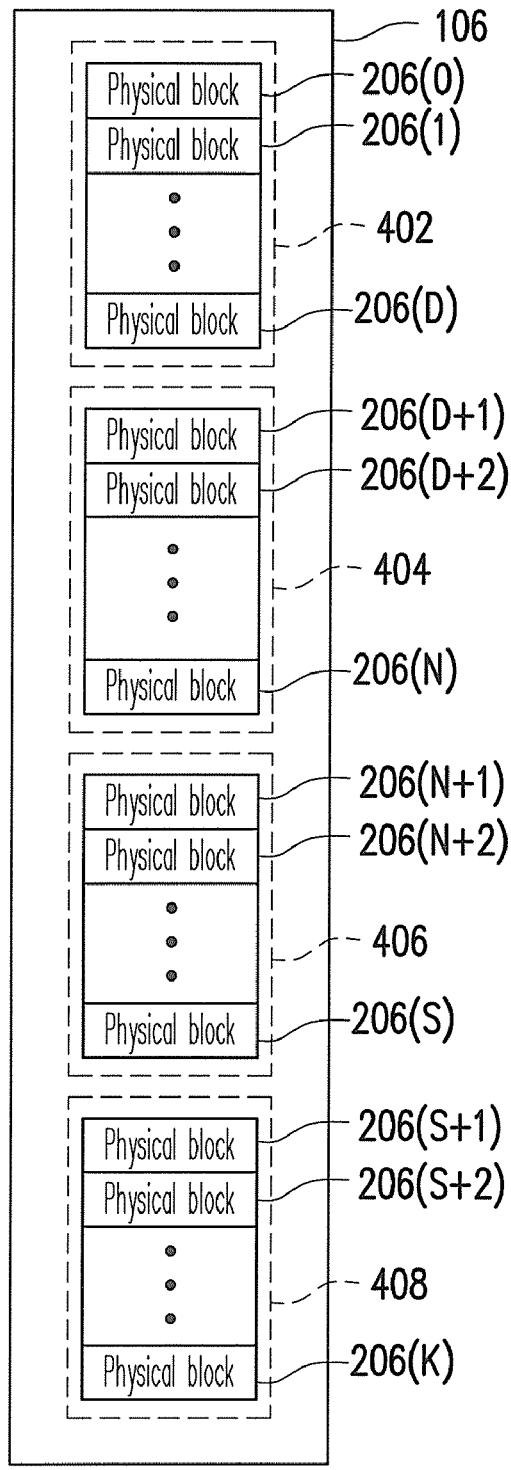
FIG. 4 and FIG. 5 are diagrams of managing the memory chip according to an exemplary embodiment of the present invention.
Figure 5:
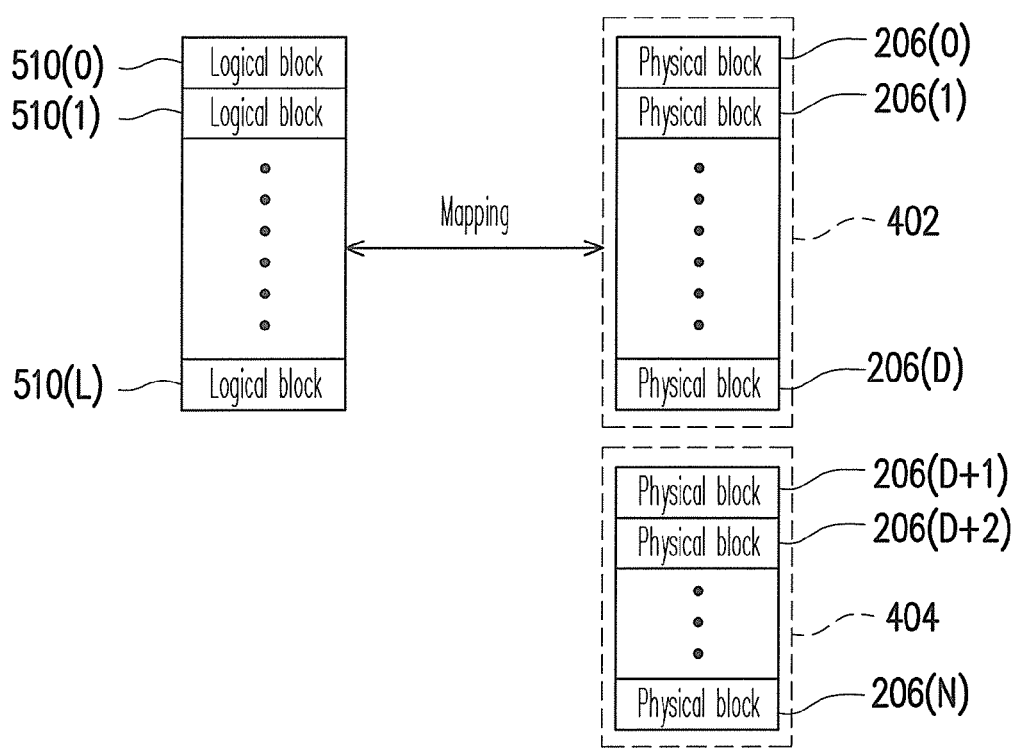

FIG. 4 and FIG. 5 are diagrams of managing the memory chip according to an exemplary embodiment of the present invention.

It should be understood that the terms used herein for describing the operations (for example, "get", "select", "replace", "group", and "alternate", etc) performed on the physical blocks of the memory chip 106 refer to logical operations performed on these physical blocks. Namely, the physical blocks in the memory chip 106 are only logically operated and the actual positions thereof are not changed.

Referring to FIG. 4, the memory management circuit 1046 logically groups the physical blocks 206(0)~206(K) of the memory chip 106 into a data area 402, a spare area 404, a system area 406 and a replacement area 408.

The physical blocks of the data area 402 and the spare area 404 are used for storing data written by the host system 1000. To be specific, the physical blocks of the data area 402 are physical blocks which have been used for storing data, and the physical blocks of the spare area 404 are physical blocks which are used for substituting the physical blocks of the data area 402. Hence, the physical blocks of the spare area 404 are either blank or available blocks (i.e., no data is recorded in these blocks or data recorded in these blocks is marked as invalid data). That is, the physical blocks of the spare area 404 have been operated by an erasing operation, or when a physical block of the spare area 404 is gotten for storing data, the gotten physical block needs to be operated by the erasing operation first. Hence, the physical blocks of the spare area 404 are available physical blocks.

The physical blocks logically belonging to the system area 406 are used for recording system data, which includes information related to the manufacturer and a model of the memory chip 106, the number of physical blocks in the memory chip 106, the number of physical pages in each physical block, and so forth.

The physical blocks logically belonging to the replacement area 408 are replacement physical blocks. For example, when the memory chip 106 is manufactured in the factory, 4% of the physical blocks thereof are reserved for replacement. When any physical block in the data area 402, the spare area 404, and the system area 406 is damaged, a physical block in the replacement area 408 is used for replacing the damaged physical block. Thus, if a physical block is damaged and there are still normal physical blocks in the replacement area 408, the memory management circuit 1046 gets a normal physical block from the replacement area 408 for replacing the damaged physical block. If a physical block is damaged and there is no more normal physical block in the replacement area 408, the memory management circuit 1046 announces the storage device 100 as being in a write-protect status and the storage device 100 cannot be used for writing data anymore.

Referring to FIG. 5, as described above, the physical blocks of the data area 402 and the spare area 404 are alternated to store data written by the host system 1000. For example, in the present exemplary embodiment, the memory management circuit 1046 configures a plurality of logical blocks and each of the logical blocks includes a plurality of logical addresses. The memory management circuit 1046 provides theses logical addresses to the host system 1000 for properly accessing data in the physical blocks that store data with the above-mentioned alternate manner. To be specific, the memory management circuit 1046 groups the logical addresses provided to the host system 1000 into logical blocks 510(0)~510(L) and maps the logical blocks 510(0)~510(L) to the physical blocks of the data area 402. The memory management circuit 1046 establishes a logical block-physical block mapping table for recoding mapping relationships between the logical blocks and the physical blocks.

In the present exemplary embodiment, the memory management circuit 1046 divides the configured logical blocks 510(0)~510(L) into a plurality of partitions, wherein each of the partitions has an individual file allocation table, an individual directory data area and an individual storage area. To be specific, one partition is considered as one logical address range among the logical blocks 510(0)~510(L), and the memory management circuit 1046 sets each of all or at least a portion of the partitions only for storing files belonging to a kind of file type. And, the memory management circuit 1046 sets an upper limit for an output flow rate of each of the set partitions according to the corresponding file type. Here, an upper limit for an output flow rate is also referred to as an output flow rate limit.

Because at least a portion of the partitions (i.e., the logical address range) are set for storing files belonging to specific file types, a manufacturer selects a corresponding partition according to the type of files to be stored and stores these files into the selected partition when the storage device 100 is manufactured in the factory. After the manufacturer has stored these files, the partitions which are set for storing files belonging to specific file types are announces as being at a write-protect status. Accordingly, a user will not change the content stored in the set partitions after the storage device 100 has be manufactured. And, for other partitions which are not set only for storing files belonging to specific file types, a user may perform general operations for accessing data after the storage device 100 has be manufactured.

Figure 6:
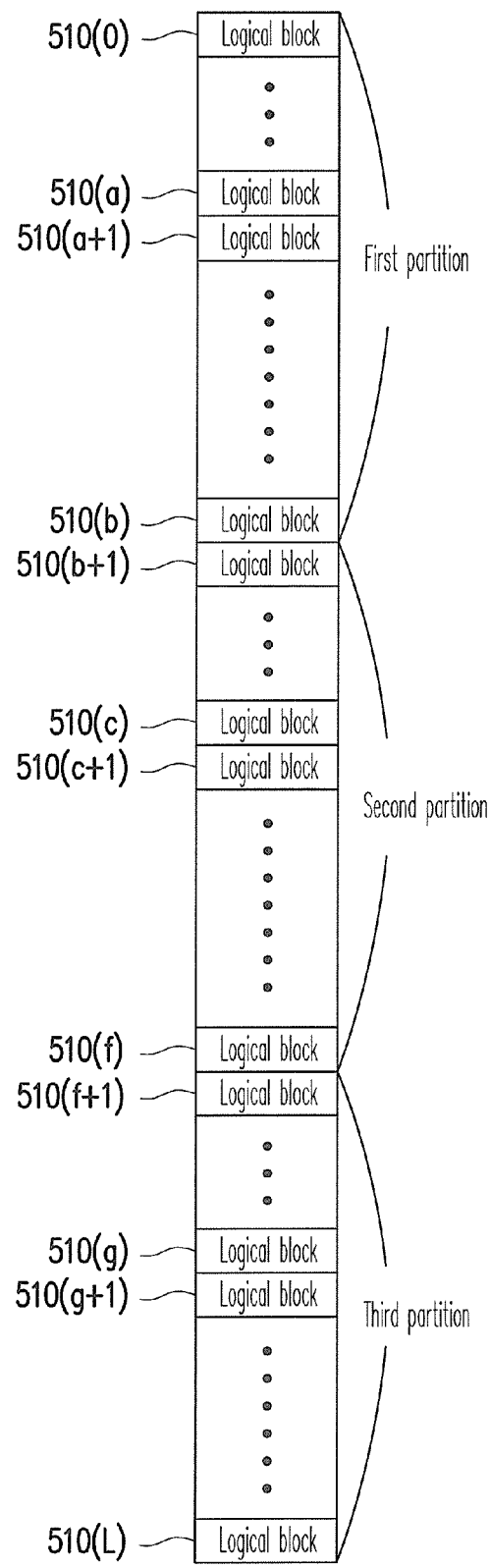
FIG. 6 is a diagram illustrating an example of dividing logical blocks according to an exemplary embodiment of the present invention.

For example, referring to FIG. 6, it is assumed that the memory management circuit 1046 divides the logical blocks 510(0)~510(L) into a first partition, a second partition and a third partition. The logical blocks 510(0)~510(a) are used for storing a file allocation table and directory data of the first partition, and the logical blocks 510(a+1)~510(b) are a storage area of the first partition. The logical blocks 510(b+1)~510(c) are used for storing a file allocation table and directory data of the second partition, and the logical blocks 510(c+1)~510(f) are a storage area of the second partition. The logical blocks 510(f+1)~510(g) are used for storing a file allocation table and directory data of the third partition, and the logical blocks 510(*g*+1)~510(L) are a storage area of the third partition.

In the present exemplary embodiment, the memory management circuit 1046 sets the first partition for storing data belonging to an audio file type, and sets the output flow rate limit of the first partition as 200 KB per second. Additionally, the memory management circuit 1046 sets the second partition for storing data belonging to an video file type, and sets the output flow rate limit of the second partition as 900 KB per second. And, the memory management circuit 1046 sets the third partition is a general partition for storing any data by a user (i.e., the output flow rate of the third partition is unlimited). It should be noted that the above-mentioned setting is an example and the present invention is not limited thereto.

During the storage device 100 is manufactured, if audio files are about to be stored into the storage device 100, the manufacturer selects the first partition for storing the audio files. And, if video files are about to be stored into the storage device 100, the manufacturer selects the second partition for storing the video files. Therefore, when the memory controller 104 receives a write command from a host system operated by the manufacturer, the memory management circuit 1046 stores data corresponding to the write command into a partition corresponding to the file type of the data.

After all write commands which are needed to be executed during the manufacture of the storage device 100 are completed, the first partition and the second partition are announces as being at the write-protect status, and then the storage device 100 is ready for sale. In other words, files that are pre-stored into the storage device 100 are stored into different partitions according to the file types of the files, and the output flow rate limits of the partitions are related to the file types set for the partitions.

When the memory controller 104 receives a read command from the host system 1000, the memory management circuit 1046 identifies a purpose of reading data by location information of the read command. In the present exemplary embodiment, the location information included in the read command is a slot parameter, and the memory management circuit 1046 gets one of the partitions as a target logical address range according to the slot parameter (i.e., a partition which conforms to the slot parameter among the partitions). If the output flow rate limit of the target logical address range is set, the memory management circuit 1046 identifies an operation that is executed on read data by the host system 1000 according to the output flow rate limit of the target logical address range.

To be specific, after the storage device 100 starts to output data, the memory management circuit 1046 calculates the speed of outputting data every a measure time. The value of the measure time is corresponding to the file type for the target logical address range. In general, the measure time corresponding to the audio file type is shorter than that corresponding to the video file type. After obtaining the amount of data outputted from the storage device 100 during the measure time, the memory management circuit 1046 calculates the current flow rate of outputting data according to the amount of data outputted from the storage device 100 and the measure time. If the current flow rate is larger than or equal to the output flow rate limit of the target logical address range and/or the amount of data outputted from the storage device 100 is larger than or equal to a predetermined value, the memory management circuit 1046 identifies the operation that is executed on the read data by the host system 1000 is a copy operation. And, if the current flow rate is smaller than the output flow rate limit of the target logical address range and/or the amount of data outputted from the storage device 100 is smaller than the predetermined value, the memory management circuit 1046 identifies the operation that is executed on the read data by the host system 1000 is a play operation.

To continue with the example shown in FIG. 6, it is assumed that the measure time corresponding to the first partition is 100 milliseconds and the measure time corresponding to the second partition is 800 milliseconds. If the target logical address range is the first partition, it represents that the host system 1000 is about to access data belonging to the audio type file. Accordingly, after the storage device 100 starts to output data, the memory management circuit 1046 obtains an amount of data outputted from the storage device 100 every 100 milliseconds and calculates a current flow rate according to the amount of data outputted from the storage device 100 during 100 milliseconds. If the current flow rate is larger than or equal to the output flow rate limit of the first partition (e.g., 200 KB per second) and/or the amount of data outputted from the storage device 100 is larger than or equal to the predetermined value (e.g., 1.8 megabytes), the memory management circuit 1046 identifies the operation that is executed on the read data by the host system 1000 is the copy operation. And, if the current flow rate is smaller than the output flow rate limit of the first partition and/or the amount of data outputted from the storage device 100 is smaller than the predetermined value, the memory management circuit 1046 identifies the operation that is executed on the read data by the host system 1000 is the play operation.

It should be noted that the play operation described in the present exemplary embodiment means that the host system 1000 reads data stored in the storage device 100 and just play the read data without writing the read data into another storage device (e.g., a hard disk of the computer 1100 or a memory card or a flash drive) besides the storage device 100. And, the copy operation described in the present exemplary embodiment means that the host system 1000 reads data stored in the storage device 100 and writes the read data into another storage device, wherein this another storage device may be disposed in the host system 1000 or externally connected to the host system 1000.

When identifying that the operation that is executed on the read data by the host system 1000 is the play operation, the memory management circuit 1046 allows the host system 1000 to continue to access the read data. However, when identifying that the operation that is executed on the read data by the host system 1000 is the copy operation, the memory management circuit 1046 executes an interference procedure to prevent the read data from being copied to the host system 1000 or slow down the speed of copying the read data to the host system 1000. The interference procedure will be described in detail thereafter.

In another exemplary embodiment, the storage device 100 only has one partition, and the memory management unit 1046 groups the configured logical blocks 510(0)~510(L) into a plurality of specific areas. In the present exemplary embodiment, each of the specific area is a logical address range among the logical blocks 510(0)~510(L). The memory management circuit 1046 sets a file type for each of the specific areas and respectively sets output flow rate limits for the specific areas based on the file types.

In the present exemplary embodiment, the manufacturer pre-stores files in the storage device 100 before the storage device 100 is ready for sale. When the memory controller 104 receives a write command from a host system operated by the manufacturer, the memory management circuit 1046 stores data corresponding to the write command into a corresponding specific area according to the file type of the data. To be specific, because different specific areas are set for storing files belonging to different file types, the storage device 100 provides an application tool for the manufacturer to set a file type of data through the application tool when writing the data into the storage device 100. Then, when a write command including the data to be written and logical addresses is given from a host system operated by the manufacturer, the application tool is capable of determining a specific area that should be used for storing the data according to the file type of the data and transforms the logical addresses in the write command into the logical addresses of the specific area. Accordingly, the memory management circuit 1046 is capable of writing the data into the specific area according to the logical addresses transferred by the application tool. And, after the manufacturer has completed the operations of pre-storing, the storage device 100 is announced as being at the write-protect status and a user can not change the content stored in the storage device 100.

Figure 7A:
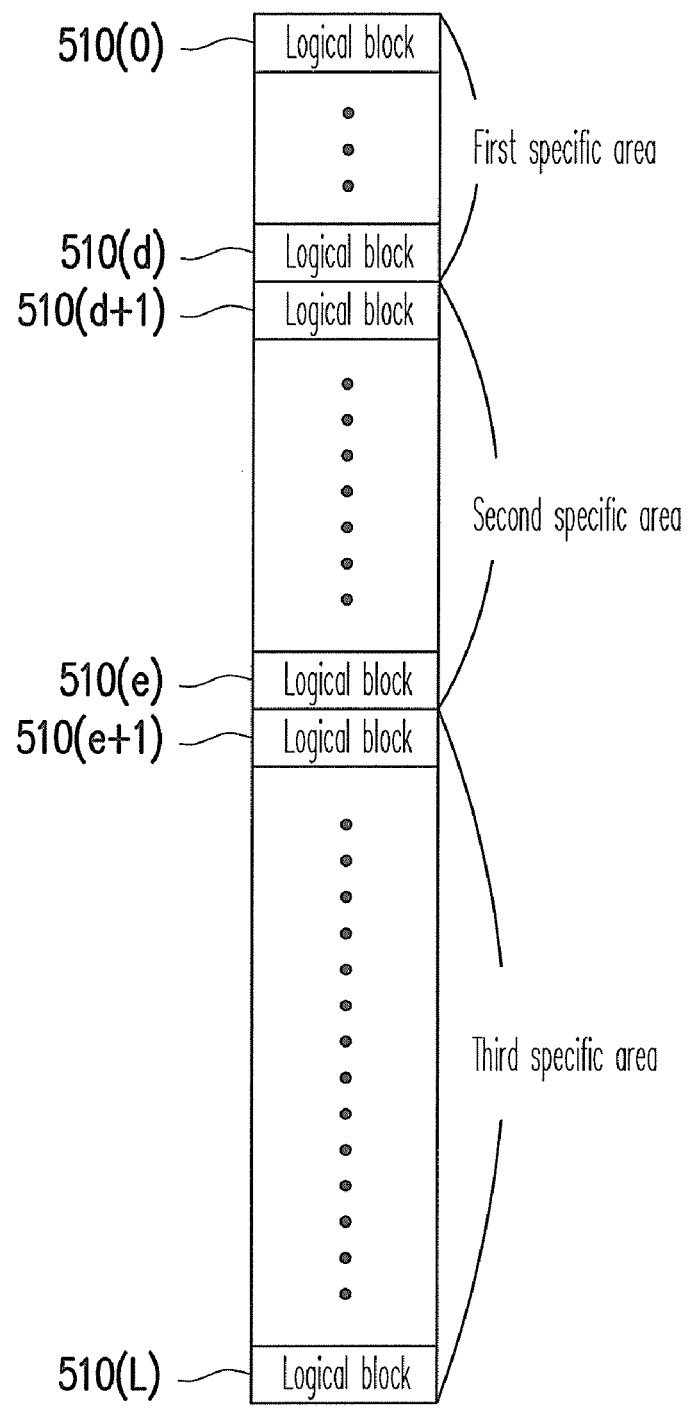
FIGS. 7A and 7B are diagrams illustrating an example of grouping logical blocks according to an exemplary embodiment of the present invention.

Referring to FIG. 7A, it is assumed that the memory management circuit 1046 groups the logical blocks 510(0)~510(L) into a first specific area, a second specific area and a third specific area, sets the logical blocks 510(0)~510(d) included in the first specific area for storing a file allocation table and directory data, sets the logical blocks 510(d+1)~510(e) included in the second specific area for storing data belonging to the audio file type, and sets the logical blocks 510(e+1)~510(L) included in the third specific area for storing data belonging to the video file type. Accordingly, when the storage device 100 receives a write command and data corresponding to the write command from a host system operated by the manufacturer, the data is stored into the second specific area if the data belongs to the audio file type and the data is stored into the third specific area if the data belongs to the video file type.

In other words, the storage device 100 uses different specific areas to store files belonging to different file types, and the output flow rate limits of the specific areas are related to the file types set for the specific areas.

When the memory controller 104 receives a read command from the host system 1000, the memory management circuit 1046 identifies an operation that is executed on read data corresponding to the read command by the host system 1000 according to location information included in the read command. In the present exemplary embodiment, the location information included in the read command is a logical access address, and the memory management circuit 1046 gets a specific area containing the logical access address among all of the specific areas as a target logical address range. Then, the memory management circuit 1046 determines whether the operation that is executed on the read data corresponding to the read command by the host system 1000 is the play operation or the copy operation according to the output flow rate limit of the target logical address range.

Figure 7B:
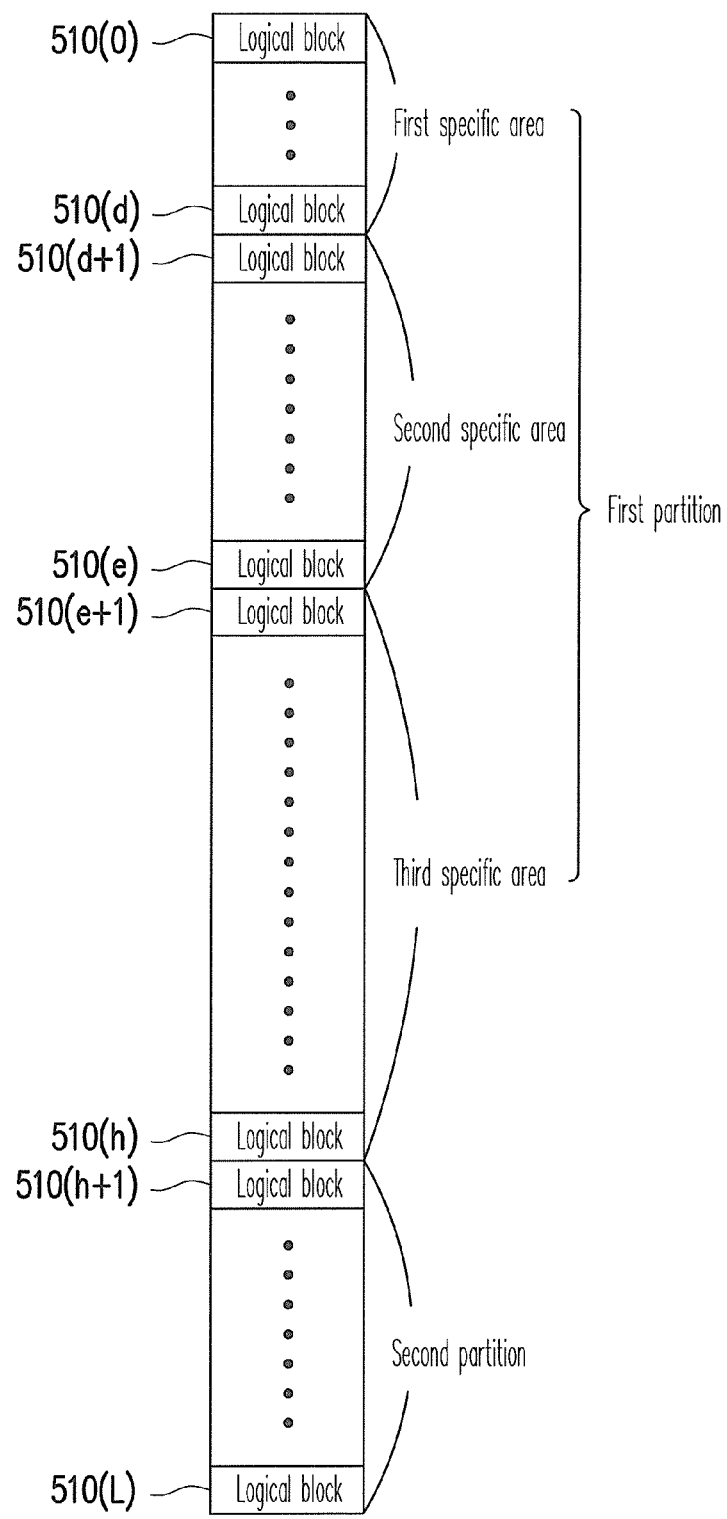

In another exemplary embodiment, the storage device 100 has a first partition and a second partition. The first partition includes three specific areas (as shown in FIG. 7B), and the memory management circuit 1046 sets the first specific area for storing a file allocation table and directory data of the first partition, sets the second specific area for storing data belonging to the audio file type, and sets the third specific area for storing data belonging to the video file type, wherein the second specific area and the third specific area respectively have output flow rate limits. Data stored in the second and third specific areas is pre-stored in the storage device 100 by the manufacturer and the first partition is announced as being at the write-protect status. The second partition is a partition that is provided for a user to store data or read data thereon after the storage device 100 has been manufactured.

When the memory controller 104 receives a read command from the host system 1000, the memory management circuit 1046 identifies an operation that is executed on read data corresponding to the read command by the host system 1000 according to location information included in the read command if the read data is stored in the second specific area or third specific area in which the output flow rate limit is set. The identifying method is the same as the foregoing exemplary embodiment and thus not repeated herein. However, if the read data is stored in the second partition, the memory management circuit 1046 does not identify the operation that is executed on the read data corresponding to the read command by the host system 1000.

When the memory management circuit 1046 identifies that the operation that is executed on the read data by the host system 1000 is the play operation, the host system 1000 is allowed to continue to access the read data. However, when the memory management circuit 1046 identifies that the operation that is executed on the read data by the host system 1000 is the copy operation, the storage device 100 executes the interference procedure to prevent the read data from being copied easily to the host system 1000.

In another exemplary embodiment, when receiving a write command from host system 1000, the memory management circuit 1046 sets a file type for a logical address section to be written by the write command according to the file type of data corresponding to the write command and records a corresponding relationship for the logical address section and the set file type thereof. And, the memory management circuit 1046 executed this setting and recording for all write commands from the host system 1000. In the present exemplary embodiment, each logical address section is considered as one logical address range among the logical blocks 510(0)~510(L). The memory management circuit 1046 sets an output flow rate limit for each logical address section based on the file type. For example, the memory management circuit 1046 may use a corresponding table to record a start address and an end address of each logical address section, a file type and an output flow rate limit thereof.

For example, it is assumed that the memory controller 104 receives a write command from the host system 1000, data included in the write command belongs to the audio file type and a logical address section to be written includes logical addresses $H_1~H_n$. Accordingly, the memory management circuit 1046 defines the logical addresses $H_1~H_n$ as one logical address range, sets a file type corresponding to the logical address range as the audio file type and sets an output flow rate limit for the logical address range according to the audio file type. The memory management circuit 1046 records the logical addresses $H_1~H_n$ and the output flow rate limit thereof in the corresponding table.

In another case, the memory controller 104 may receive a write command from the host system 1000, data included in the write command belongs to the video file type and a logical address section to be written includes logical addresses $P_1~P_m$. Accordingly, the memory management circuit 1046 defines the logical addresses $P_1~P_m$ as another logical address range, sets a file type corresponding to this logical address range as the video file type and sets an output flow rate limit for this logical address range according to the video file type. The memory management circuit 1046 also records the logical addresses $P_1~P_m$ and the output flow rate limit thereof in the corresponding table.

In the present exemplary embodiment, the memory management circuit 1046 does not limit addresses for storing data written into the storage device 100. Because it is not needed to store data according to a file type corresponding to the data, pieces of data belonging to the same file type may be stored dispersedly or centrally.

When the memory controller 104 receives a read command from the host system 1000, the memory management circuit 1046 identifies an operation that is executed on read data corresponding to the read command by the host system 1000 according to location information included in the read command. In this exemplary embodiment, the location information is a logical access address. The memory management circuit 1046 compares the logical access address with information recorded in the corresponding table and gets a logical address section among the logical address sections as a target logical address range, wherein the start address of the gotten logical address section is the logical access address. Then, the memory management circuit 1046 determines whether the operation that is executed on the read data corresponding to the read command by the host system 1000 is the play operation or the copy operation according to the output flow rate limit of the target logical address range.

The method of identifying whether the operation is the play operation or the copy operation is the same as that in the foregoing exemplary embodiment and thus not repeated herein. When the memory management circuit 1046 identifies that the operation that is executed on the read data by the host system 1000 is the play operation, the host system 1000 is allowed to continue to access the read data. However, when the memory management circuit 1046 identifies that the operation that is executed on the read data by the host system 1000 is the copy operation, the storage device 100 executes the interference procedure to prevent the read data from being copied easily to the host system 1000.

Figure 8:
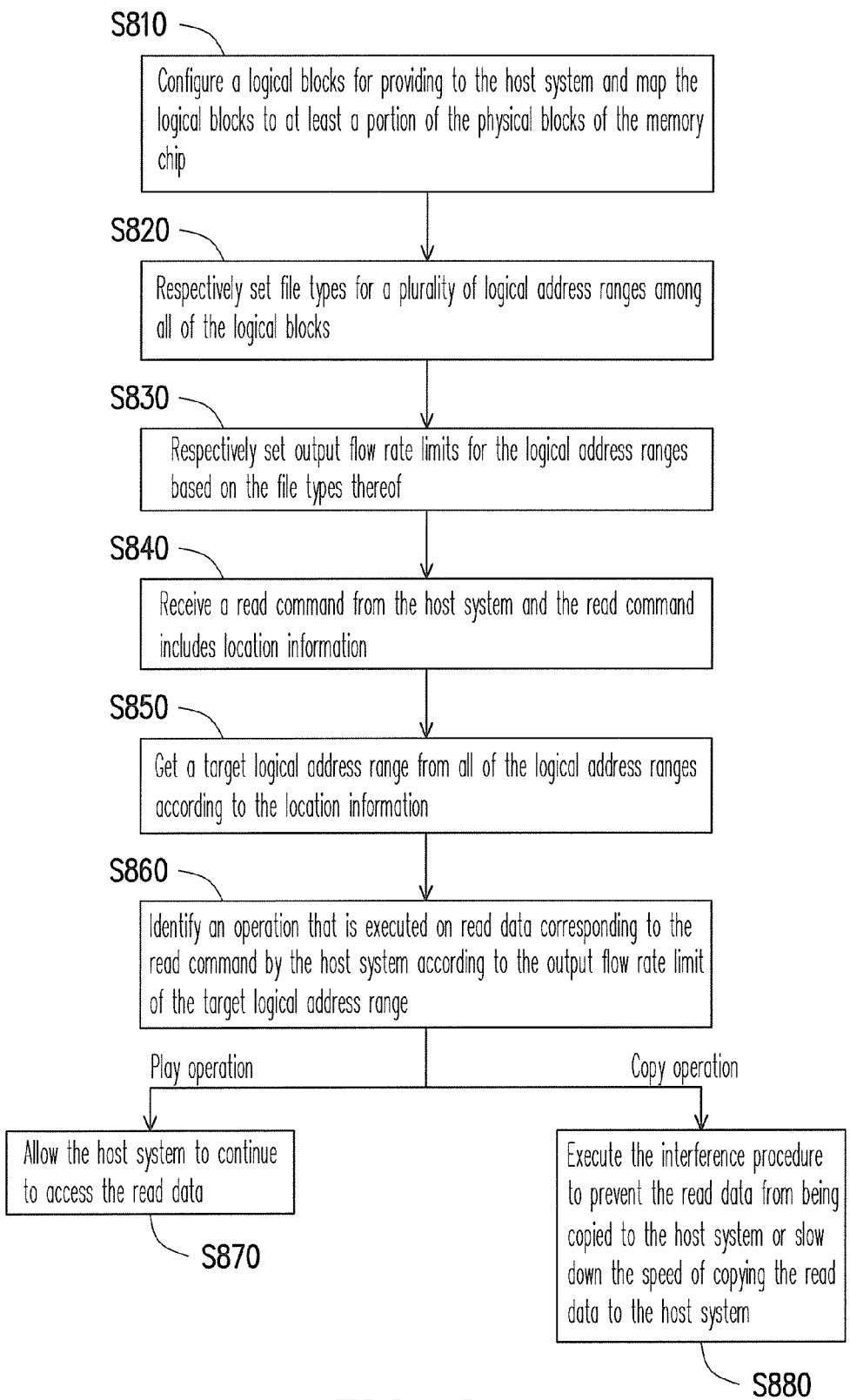
FIG. 8 is a flowchart illustrating a data protection method according to an exemplary embodiment of the present invention.

FIG. 8 is a flowchart illustrating a data protection method according to an exemplary embodiment of the present invention.

Referring to FIG. 8, the memory management circuit 1046 configures a plurality of logical blocks for providing to the host system 1000 and maps the logical blocks to at least a portion of the physical blocks of the memory chip 106 (S810).

Then, the memory management circuit 1046 respectively sets file types for a plurality of logical address ranges among all of the logical blocks (S820) and respectively sets output flow rate limits for the logical address ranges based on the file types thereof (S830).

When the memory controller 104 receives a read command from the host system 1000 and the read command includes location information (S840), the memory management circuit 1046 gets a target logical address range from all of the logical address ranges according to the location information (S850).

Then, the memory management circuit 1046 identifies an operation that is executed on read data corresponding to the read command by the host system 1000 according to the output flow rate limit of the target logical address range (S860).

If the memory management circuit 1046 identifies that the operation that is executed on the read data by the host system 1000 is the play operation, the host system 1000 is allowed to continue to access the read data (S870).

If the memory management circuit 1046 identifies that the operation that is executed on the read data by the host system 1000 is the copy operation, the storage device executes the interference procedure to prevent the read data from being copied to the host system 1000 or slow down the speed of copying the read data to the host system 1000 (S880).

A data protection mechanism provided by another exemplary embodiment will be described with the storage device 100 as follows.

With different transmission interfaces adopted between the storage device 100 and the host system 1000, the speed of reading data from the storage device 100 to the host system 1000 is various. In particular, the speeds of transmission interfaces, which are the same interface but have different versions, still are different. For example, when the host system 1000 adopting USB 2.0 reads data from the storage device 100, the speed of outputting the data is 30 megabytes per second. However, when the host system 1000 adopting USB 1.1 reads data from the storage device 100, the speed of outputting the data is 1.5 megabytes per second.

Accordingly, in an exemplary embodiment described below, the memory controller 104 of the storage device 100 identifies a purpose of reading data by the host system 1000 according to the output flow rate limit of a transmission interface type.

In details, besides the configuration of the logical blocks for mapping to at least a portion of the physical blocks, the memory management circuit 1046 of the memory controller 104 sets a plurality of transmission interface types and a plurality of output flow rate limits corresponding to the transmission interface types. In the present exemplary embodiment, different transmission interface types are corresponding to different output flow rate limits. And, transmission interfaces that are the same interface and have different versions may be corresponding to different output flow rate limits or the same output flow rate limit. For example, USB 1.1, USB 2.0 and USB 3.0 may be corresponding to the same output flow rate limit (e.g., 800 kilobytes per second) or corresponding to different output flow rate limits based on the transmission speeds thereof. For example, if the transmission speed of a transmission interface is larger, the output flow rate limit of the transmission interface is larger.

When the storage device 100 uses one of the transmission interfaces to receive a read command from the host system 1000, the memory management circuit 1046 identifies whether an operation that is executed on read data corresponding to the read command by the host system 1000 is the play operation or the copy operation according to the output flow rate limit corresponding to the type of the used transmission interface.

To be specific, after the storage device 100 starts to output data to the host system 1000, the memory management circuit 1046 calculates the speed of outputting data every a measure time, wherein the value of the measure time is corresponding to the used transmission interface. For example, when a transmission interface having a larger transmission speed is used, the measure time is shorter. Contrariwise, a transmission interface having a smaller transmission speed is used, the measure time is longer. And, transmission interfaces that are the same interface and have different versions may be corresponding to different measure times according to the transmission speeds thereof. For example, the measure times for USB 1.1, USB 2.0 and USB 3.0 may be 500 milliseconds, 100 milliseconds and 80 milliseconds, respectively.

In order to identify a purpose of reading data by the host system 1000, the memory management circuit 1046 obtains an amount of data outputted from the storage device 100 during the measure time and calculates the current flow rate of outputting data according to the amount and the measure time.

If the current flow rate is smaller than the output flow rate limit corresponding to the used transmission interface and/or the amount of data outputted from the storage device 100 during the measure time is smaller than a predetermined value, the memory management circuit 1046 identifies the operation that is executed on read data by the host system 1000 is the play operation. At this time, the host system 1000 is allowed to continue to access data stored in the memory chip 106.

If the current flow rate is larger than or equal to the output flow rate limit corresponding to the used transmission interface and/or the amount of data outputted from the storage device 100 during the measure time is larger than or equal to a predetermined value, the memory management circuit 1046 identifies the operation that is executed on read data by the host system 1000 is the copy operation. At this time, the storage device 1000 executes the interference procedure to prevent the read data from being copied to the host system 1000 or slow down the speed of copying the read data to the host system 1000.

Figure 9:
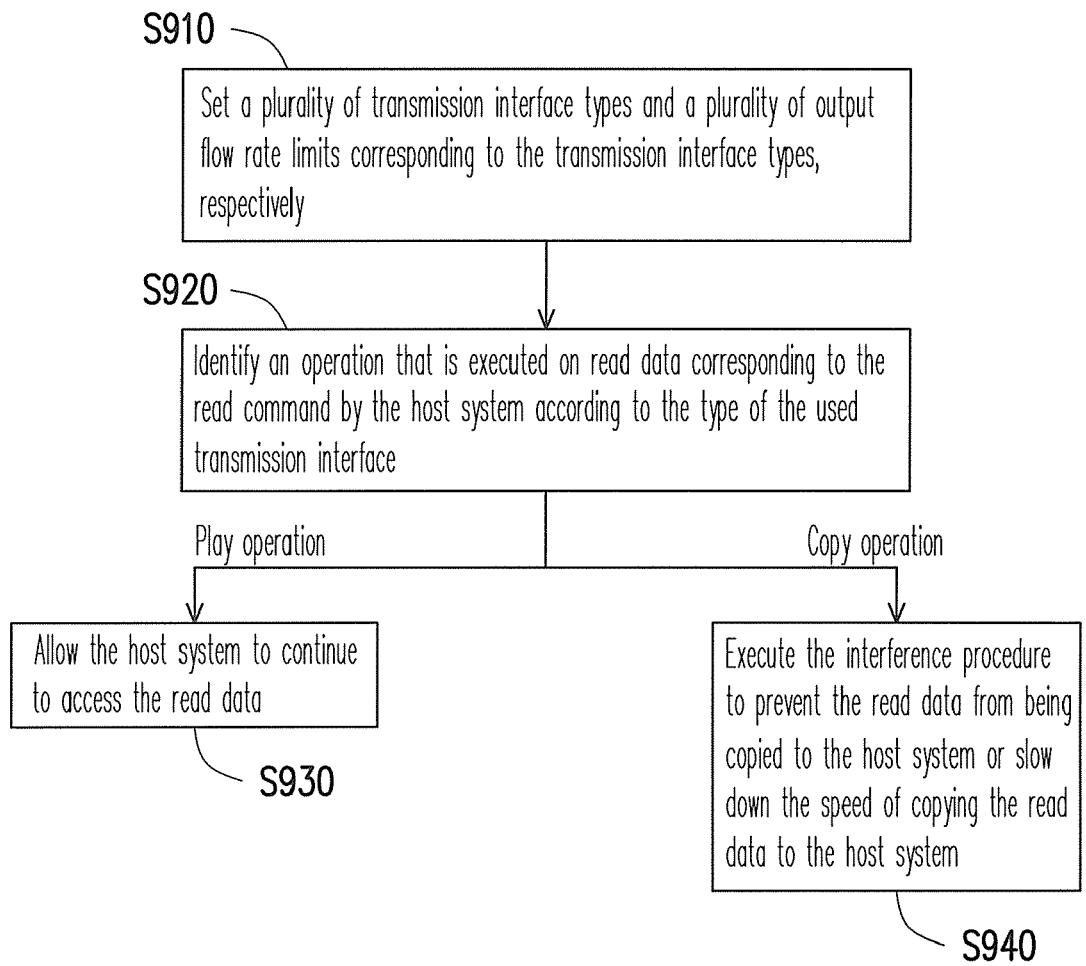
FIG. 9 is a flowchart illustrating a data protection method according to another exemplary embodiment of the present invention.

FIG. 9 is a flowchart illustrating a data protection method according to another exemplary embodiment of the present invention.

Referring to FIG. 9, the memory management circuit 1046 of the memory controller 104 sets a plurality of transmission interface types and a plurality of output flow rate limits corresponding to the transmission interface types, respectively (S910).

Then, when the storage device 100 uses one of the transmission interfaces to receive a read command from the host system 1000, the memory management circuit 1046 identifies an operation that is executed on read data corresponding to the read command by the host system 1000 according to the output flow rate limit corresponding to the type of the used transmission interface (S920).

If the memory management circuit 1046 identifies that the operation that is executed on the read data by the host system 1000 is the play operation, the host system 1000 is allowed to continue to access the read data (S930).

If the memory management circuit 1046 identifies that the operation that is executed on the read data by the host system 1000 is the copy operation, the storage device 100 executes the interference procedure to prevent the read data from being copied to the host system 1000 or slow down the speed of copying the read data to the host system 1000 (S940).

In the foregoing exemplary embodiment, when the memory management circuit 1046 identifies that the operation that is executed on the read data by the host system 1000 is the copy operation, the interference procedure executed by the storage device 100 includes transmitting a message to the host system 1000. Herein, the transmitted message includes a media alternative message, a cyclic redundancy check error message, an ECC error message, a read fail message or a no media message. And, after receiving the message, the host system 1000 can not continue to read data and copy the data. To be specific, after receiving the message, the host system 1000 identifies that there is an error on the format of the storage device 100 and may show an interactive windows to inquire whether a user wants to execute a format command to the storage device 100. In order to prevent data stored in the storage device 100 from being deleting due to the format command executed accidentally by the user, the memory management circuit 1046 announces the storage device 100 as being at the write-protect status.

Additionally, the interference procedure executed by the storage device 100 also includes executing a limitless loop to make the storage device 100 to be at a crash status. At this time, unless the user re-connects the storage device 100 to the host system 1000, the storage device 100 can not execute any operations.

Furthermore, the interference procedure executed by the storage device 100 further includes transmitting the read data to the host system 1000 with a predetermined speed which is very slow or transmitting the read data to the host system 1000 after waiting a delay time. Accordingly, it can prevent data from being copied fast to the host system 1000.

In summary, the storage device, the memory controller and the data protection method of the exemplary embodiments sets different flow rate limits according to location information included in a read command transmitted by the host or the type of a transmission interface between the host and the storage device and therefore identifies a purpose of reading data by the host. Accordingly, a file is played smooth when the host wants to play the file, and the file is not easy to copy to the host when the host wants to copy the file, thereby protecting data stored in the storage device. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data protection method, for a storage device, wherein a memory chip of the storage device has a plurality of physical blocks, the data protection method comprising:
   configuring a plurality of logical blocks for mapping to at least a portion of the physical blocks, wherein each of the logical blocks includes a plurality of logical addresses;
   respectively setting a plurality of output flow rate limits for a plurality of logical address ranges among the logical blocks based on a plurality of file types, wherein each of the logical address ranges is corresponding to one of the file types;
   receiving a read command from a host, wherein the read command includes location information;
   getting a target logical address range from the logical address ranges according to the location information;
   identifying an operation that is executed on read data corresponding to the read command by the host based on the output flow rate limit of the target logical address range; and
   executing an interference procedure by the storage device to prevent the read data from being copied to the host or slow down a speed of copying the read data to the host when identifying that the operation is a copy operation.

2. The data protection method according to claim 1, wherein, after the step of configuring the logical blocks for mapping to at least a portion of the physical blocks, the data protection method further comprising:
   dividing the logical blocks into a plurality of partitions as the logical address ranges;
   setting the file types corresponding to the partitions, respectively; and
   storing data corresponding to a write command into one of the partitions according to the file type of the data when receiving the write command from the host.

3. The data protection method according to claim 2, wherein the location information is a slot parameter and the target logical address range is a partition conforming to the slot parameter among the partitions.

4. The data protection method according to claim 1, wherein, after the step of configuring the logical blocks for mapping to at least a portion of the physical blocks, the data protection method further comprising:

grouping the logical blocks into a plurality of specific areas as the logical address ranges;

setting the file types corresponding to the specific areas, respectively; and storing data corresponding to a write command into one of the specific areas according to the file type of the data when receiving the write command from the host.

5. The data protection method according to claim 4, wherein the location information is a logical access address and the target logical address range is a specific area including the logical access address among the specific areas.

6. The data protection method according to claim 1, wherein, after the step of configuring the logical blocks for mapping to at least a portion of the physical blocks, the data protection method further comprising:

setting and recording respectively the file types for logical address sections to be written by write commands received from the host according to the file types of data corresponding to the write commands; and serving the recorded logical address sections as the logical address ranges.

7. The data protection method according to claim 6, wherein the location information is a logical access address and a start address of the target logical address range is the logical access address.

8. The data protection method according to claim 1, wherein the step of identifying the operation that is executed on the read data corresponding to the read command by the host based on the output flow rate limit of the target logical address range comprises:

obtaining an amount of outputting data from the storage device during a measure time, wherein the measure time is corresponding to the file type of the target logical address range;

calculating a current flow rate according to the measure time and the amount of outputting data from the storage device;

identifying the operation that is executed on the read data by the host system is the copy operation when the current flow rate is larger than or equal to the output flow rate limit of the target logical address range and/or the amount of outputting data from the storage device is larger than or equal to a predetermined value; and identifying the operation that is executed on the read data by the host system is a play operation when the current flow rate is smaller than the output flow rate limit of the target logical address range and/or the amount of outputting data from the storage device is smaller than the predetermined value.

9. The data protection method according to claim 1, wherein the interference procedure at least includes one of procedures and the procedures includes: transmitting a message to the host, executing a limitless loop to make the storage device to crash, transmitting the read data to the host with a predetermined transmission speed, and transmitting the read data to the host after a delay time.

10. A storage device, comprising:

a memory chip, having a plurality of physical blocks;

a connector, coupled to a host; and a memory controller, coupled to the memory chip and the connector and configured to:

configure a plurality of logical blocks for mapping to at least a portion of the physical blocks, wherein each of the logical blocks includes a plurality of logical addresses;

respectively set a plurality of output flow rate limits for a plurality of logical address ranges among the logical blocks based on a plurality of file types, wherein each of the logical address ranges is corresponding to one of the file types;

receive a read command from the host, wherein the read command includes location information;

get a target logical address range from the logical address ranges according to the location information;

identify an operation that is executed on read data corresponding to the read command by the host system based on the output flow rate limit of the target logical address range; and execute an interference procedure to prevent the read data from being copied to the host or slow down a speed of copying the read data to the host when identifying that the operation is a copy operation.

11. The storage device according to claim 10, wherein the memory controller is further configured to divide the logical blocks into a plurality of partitions as the logical address ranges, and set the file types corresponding to the partitions, respectively, wherein the memory controller is further configured to store data corresponding to a write command into one of the partitions according to the file type of the data when receiving the write command from the host.

12. The storage device according to claim 10, wherein the memory controller is further configured to group the logical blocks into a plurality of specific areas as the logical address ranges, and set the file types corresponding to the specific areas, respectively, the memory controller is further configured to store data corresponding to a write command into one of the specific areas according to the file type of the data when receiving the write command from the host.

13. The storage device according to claim 10, wherein the memory controller is further configured to set and record respectively the file types for logical address sections to be written by write commands received from the host according to the file types of data corresponding to the write commands, and the memory controller is further configured to serve the recorded logical address sections as the logical address ranges.

14. A memory controller, for managing a plurality of physical blocks of a memory chip of a storage device, the memory controller comprising:

a memory management circuit;

a memory interface, coupled to the memory management circuit and configured to couple to the memory chip;

a host interface, coupled to the memory management circuit and configured to couple to a host, wherein the memory management circuit is further configured to:

configure a plurality of logical blocks for mapping to at least a portion of the physical blocks, wherein each of the logical blocks includes a plurality of logical addresses;

respectively set a plurality of output flow rate limits for a plurality of logical address ranges among the logical blocks based on a plurality of file types, wherein each of the logical address ranges is corresponding to one of the file types;

receive a read command from the host, wherein the read command includes location information;

get a target logical address range from the logical address ranges according to the location information;

identify an operation that is executed on read data corresponding to the read command by the host system based on the output flow rate limit of the target logical address range; and execute an interference procedure to prevent the read data from being copied to the host or slow down a speed of copying the read data to the host when identifying that the operation is a copy operation.

15. The memory controller according to claim 14, wherein the memory management circuit is further configured to divide the logical blocks into a plurality of partitions as the logical address ranges, and set the file types corresponding to the partitions, respectively, wherein the memory management circuit is further configured to store data corresponding to a write command into one of the partitions according to the file type of the data when receiving the write command from the host.

16. The memory controller according to claim 15, wherein the location information is a slot parameter and the target logical address range is a partition conforming to the slot parameter among the partitions.

17. The memory controller according to claim 14, wherein the memory management circuit is further configured to group the logical blocks into a plurality of specific areas as the logical address ranges, and set the file types corresponding to the specific areas, respectively, wherein the memory management circuit is further configured to store data corresponding to a write command into one of the specific areas according to the file type of the data when receiving the write command from the host.

18. The memory controller according to claim 17, wherein the location information is a logical access address and the target logical address range is a specific area including the logical access address among the specific areas.

19. The memory controller according to claim 14, wherein the memory management circuit is further configured to set and record respectively the file types for logical address sections to be written by write commands received from the host according to the file types of data corresponding to the write commands, and the memory management circuit is further configured to serve the recorded logical address sections as the logical address ranges.

20. The memory controller according to claim 19, wherein the location information is a logical access address and a start address of the target logical address range is the logical access address.

21. The memory controller according to claim 14, wherein the memory management circuit is further configured to obtain an amount of outputting data from the storage device during a measure time and calculate a current flow rate according to the measure time and the amount of outputting data from the storage device, wherein the measure time is corresponding to the file type of the target logical address range, wherein the memory management circuit is further configured to identify the operation that is executed on the read data by the host system is the copy operation when the current flow rate is larger than or equal to the output flow rate limit of the target logical address range and/or the amount of outputting data from the storage device is larger than or equal to a predetermined value, and wherein the memory management circuit is further configured to identify the operation that is executed on the read data by the host system is a play operation when the current flow rate is smaller than the output flow rate limit of the target logical address range and/or the amount of outputting data from the storage device is smaller than the predetermined value.

22. The memory controller according to claim 14, wherein the interference procedure at least includes one of procedures and the procedures includes: transmitting a message to the host, executing a limitless loop to make the storage device to crash, transmitting the read data to the host with a predetermined transmission speed, and transmitting the read data to the host after a delay time.

23. A data protection method, for a storage device, wherein a memory chip of the storage device has a plurality of physical blocks, the data protection method comprising:

configure a plurality of logical blocks for mapping to at least a portion of the physical blocks, wherein each of the logical blocks includes a plurality of logical addresses;

setting a plurality of transmission interface types and an output flow rate limits corresponding to each of the transmission interface types;

when the storage device uses one of the transmission interface types to receive a read command from a host, identifying an operation that is executed on read data corresponding to the read command by the host based on the output flow rate limit corresponding to one of the transmission interface types; and executing an interference procedure to prevent the read data from being copied to the host or slow down a speed of copying the read data to the host when identifying that the operation is a copy operation.

24. The data protection method according to claim 23, wherein the step of identifying the operation that is executed on the read data corresponding to the read command by the host based on the output flow rate limit corresponding to the one of the transmission interface types comprises:

obtaining an amount of outputting data from the storage device during a measure time, wherein the measure time is corresponding to the one of the transmission interface types;

calculating a current flow rate according to the measure time and the amount of outputting data from the storage device;

identifying the operation that is executed on the read data by the host system is the copy operation when the current flow rate is larger than or equal to the output flow rate limit corresponding to the one of the transmission interface types and/or the amount of outputting data from the storage device is larger than or equal to a predetermined value; and identifying the operation that is executed on the read data by the host system is a play operation when the current flow rate is smaller than the output flow rate limit corresponding to the one of the transmission interface types and/or the amount of outputting data from the storage device is smaller than the predetermined value.

25. The data protection method according to claim 23, wherein the interference procedure at least includes one of procedures and the procedures includes: transmitting a message to the host, executing a limitless loop to make the storage device to crash, transmitting the read data to the host with a predetermined transmission speed, and transmitting the read data to the host after a delay time.

* * * * *